United States Patent
Hassan et al.

(10) Patent No.: US 10,548,114 B2
(45) Date of Patent: Jan. 28, 2020

(54) MULTI-TIER SPECTRUM ACCESS CHANNEL ASSIGNMENT

(71) Applicant: Microsoft Technology Licensing, LLC, Redmond, WA (US)

(72) Inventors: Amer A. Hassan, Kirkland, WA (US); Paul W. Garnett, Fremont, CA (US); Paul W. Mitchell, Seattle, WA (US); Jeffrey Z. Yan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/659,578

(22) Filed: Jul. 25, 2017

(65) Prior Publication Data
US 2019/0037537 A1    Jan. 31, 2019

(51) Int. Cl.
*H04Q 7/00*     (2006.01)
*H04W 72/04*    (2009.01)
(Continued)

(52) U.S. Cl.
CPC ............ *H04W 72/04* (2013.01); *G06F 16/27* (2019.01); *H04W 60/00* (2013.01)

(58) Field of Classification Search
CPC ............... H04W 4/70; H04W 52/0216; H04W 52/0219; H04W 68/005; H04W 68/02; H04W 12/06; H04W 72/04
(Continued)

(56) References Cited

U.S. PATENT DOCUMENTS

| 2004/0172302 A1* | 9/2004 | Martucci | A61B 5/0002 705/2 |
| 2004/0176667 A1* | 9/2004 | Mihai | A61B 5/0002 600/300 |

(Continued)

FOREIGN PATENT DOCUMENTS

| WO | 2013112189 A1 | 8/2013 |
| WO | 2015171759 A1 | 11/2015 |

OTHER PUBLICATIONS

Abdelhadi, et al., "A Multi-Tier Wireless Spectrum Sharing System Leveraging Secure Spectrum Auctions", In Journal of Computing Research Repository, Mar. 2015, pp. 1-11.
(Continued)

*Primary Examiner* — Joseph Arevalo
(74) *Attorney, Agent, or Firm* — NovoTechIP International PLLC

(57) ABSTRACT

An apparatus controlling channel assignments for a shared access system is disclosed. The apparatus generates a first registration in a database that indicates that a first channel is assigned to a device and sends the identity of the first channel to the device. The device may use the first channel to communicate with other devices in the system. The apparatus may receive a query from the device indicating the first channel is encumbered. In response to the query, the apparatus may send the identity of a second channel to the device, generate a second registration in the database that indicates that the second channel is assigned to the device, and generate an amendment to the database indicating that the first channel is encumbered. The apparatus may then verify whether the first channel is encumbered and remove or keep the amendment in the database based on the verification.

35 Claims, 6 Drawing Sheets

(51) Int. Cl.
*G06F 16/27* (2019.01)
*H04W 60/00* (2009.01)

(58) Field of Classification Search
USPC .......... 455/411, 435.1, 466, 552.1, 509, 558, 455/458, 404.1, 456.1, 418, 434, 450, 455/415, 464, 515, 413, 56; 370/329, 370/315, 311, 330, 252, 344
See application file for complete search history.

(56) References Cited

U.S. PATENT DOCUMENTS

| | | | | |
|---|---|---|---|---|
| 2009/0028260 A1* | 1/2009 | Xiao | ...................... | H04L 1/0026 375/260 |
| 2009/0100457 A1* | 4/2009 | Lee | ...................... | H04N 7/17318 725/28 |
| 2009/0161610 A1 | 6/2009 | Kang et al. | | |
| 2010/0054228 A1 | 3/2010 | Michaels | | |
| 2011/0287743 A1* | 11/2011 | Hu | .......................... | H04L 67/16 455/411 |
| 2012/0094681 A1* | 4/2012 | Freda | .................... | H04W 72/02 455/452.1 |
| 2012/0210386 A1* | 8/2012 | Kim | ................... | H04N 21/4622 725/148 |
| 2012/0250578 A1* | 10/2012 | Pani | ...................... | H04W 48/12 370/254 |
| 2013/0223227 A1* | 8/2013 | Lee | .................... | H04B 7/15557 370/236 |
| 2014/0295877 A1* | 10/2014 | Hart | ........................ | H04W 4/02 455/456.1 |
| 2015/0230255 A1 | 8/2015 | Lopes | | |
| 2015/0373554 A1 | 12/2015 | Freda et al. | | |
| 2016/0037570 A1* | 2/2016 | Guo | ...................... | H04W 76/14 455/404.1 |
| 2016/0212624 A1 | 7/2016 | Mueck et al. | | |
| 2016/0241658 A1* | 8/2016 | Fryc | ........................ | G06F 21/43 |
| 2016/0242031 A1 | 8/2016 | Ojanen et al. | | |
| 2016/0262024 A1 | 9/2016 | Freda et al. | | |
| 2016/0309442 A1* | 10/2016 | Lian | ...................... | H04W 64/00 |
| 2017/0078999 A1* | 3/2017 | Dai | ....................... | H04W 48/18 |
| 2017/0164207 A1 | 6/2017 | Ghosh | | |
| 2017/0279759 A1* | 9/2017 | Liden | ..................... | H04L 51/36 |
| 2019/0021002 A1* | 1/2019 | Kang | ................... | H04L 9/0869 |

OTHER PUBLICATIONS

Acharya, et al., "A Framework for Dynamic Spectrum Sharing between Cognitive Radios", In Proceedings of IEEE International Conference on Communications, Jun. 24, 2007, pp. 5166-5171.
"International Search Report and Written Opinion Issued in PCT Application No. PCT/US18/034819", dated Aug. 20, 2018, 12 Pages.

* cited by examiner

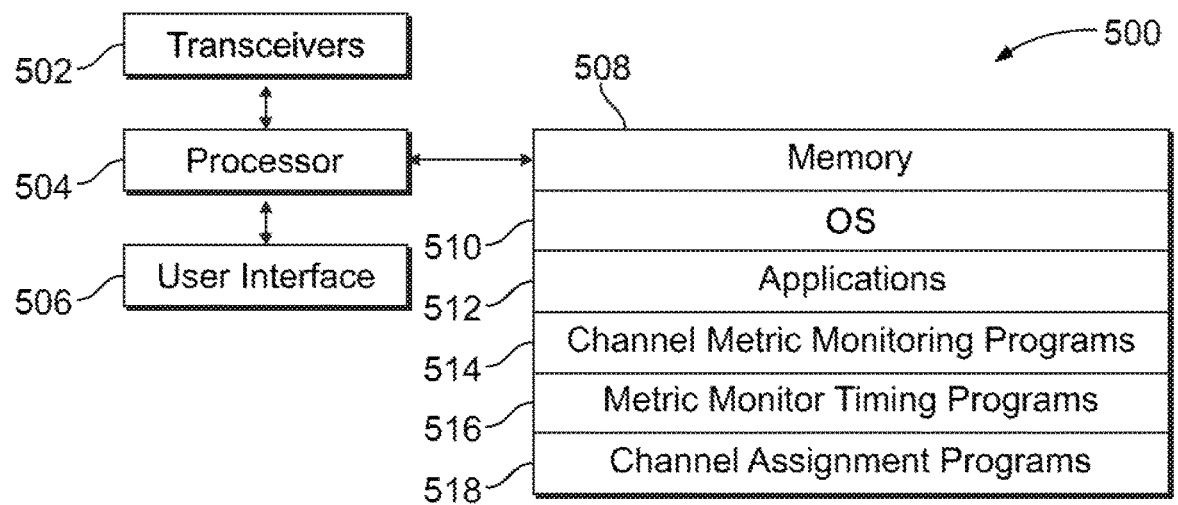
FIG. 5
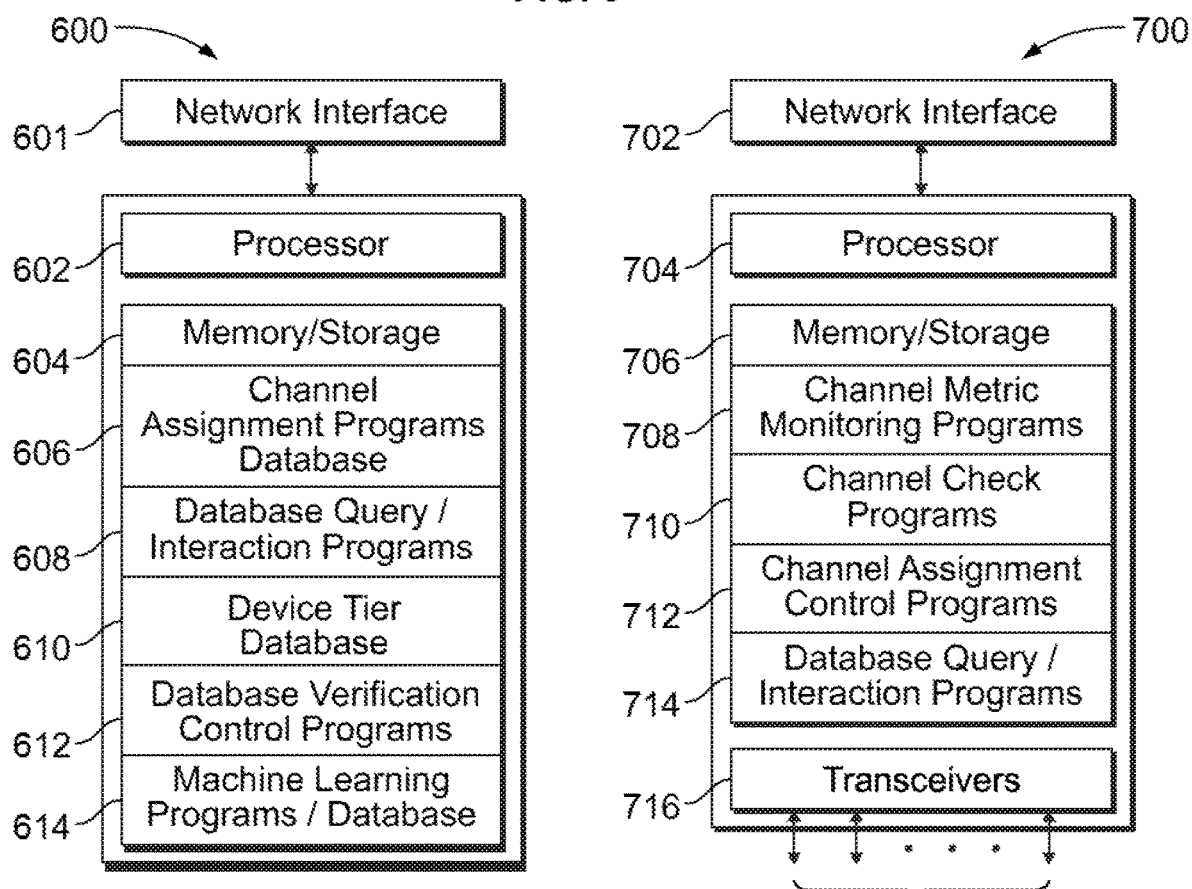
FIG. 6
FIG. 7

MULTI-TIER SPECTRUM ACCESS CHANNEL ASSIGNMENT

BACKGROUND

Various types of wireless systems that utilize channels in frequency spectrum shared with other systems have been proposed. The sharing of frequency spectrum allows a wireless system to increase system bandwidth when channels in the shared frequency spectrum are available for use by the wireless system. In various systems, the shared frequency spectrum may be spectrum in unlicensed frequency bands or spectrum in licensed/allocated frequency bands that are shared between licensed systems, for example, on a prioritization basis. The prioritization may be implemented on a tier level basis, in which different levels of priority for use of the frequency spectrum are assigned to different systems.

An example of a system that utilizes spectrum in unlicensed frequency bands is a long term evolution unlicensed band (LTE-U) system. LTE-U is a technology that enables base stations to operate using LTE technology on shared channels in the 5 GHz and 3.5 GHz unlicensed bands that are primarily used for devices in Wi-Fi systems. Another example of a system utilizing shared frequency spectrum is a Dynamic Spectrum Access (DSA) system. A DSA system is typically configured so that base stations/systems within the DSA system use channels in a frequency spectrum shared with other base stations/systems of the DSA system under the coordination of a controller that manages a channel assignment database. Various groups in the wireless industry are currently working to standardize operating rules for DSA systems that have multiple levels of priority for spectrum access. A DSA system having multiple levels of priority is commonly known as a shared access system (SAS).

SUMMARY

This summary is provided to introduce a selection of concepts in a simplified form that are further described below in the Detailed Description. This summary is not intended to exclusively or exhaustively identify key features or essential features of the claimed subject matter. Nor is it intended as an aid in determining the scope of the claimed subject matter.

Use of the embodiments allows an apparatus controlling channel assignments for a shared access system (SAS) to obtain current information on channel usage and encumbrances as determined by devices operating on assigned channels in the shared access system. The apparatus may then use the current information to make channel assignments to devices/networks operating in the SAS and/or make up-to-date amendments to a channel assignment database based on the current information. Because the current information determined by the devices may be more accurate and more up-to-data than information available in the channel assignment database, the apparatus may control channel assignments in the SAS in a more efficient manner.

An implementation includes a base station operating in a network that is part of a SAS that includes multiple networks. The base station may receive channel assignments from a controller that manages a SAS channel assignment database to allocate shared frequency spectrum to devices/base stations in the multiple networks. The base station may communicate on the assigned channels with one or more mobile devices operating in the coverage area of the base station. In operation, the base station requests a channel assignment by sending a database query to the controller. In response, the base station receives a channel assignment from the controller that assigns at least one channel to the base station for communications with the one or more mobile devices. During communications with the one or more mobile devices, the base station monitors a metric on a selected channel of the assigned channels and determines a value of the metric. If the value of the metric is at or above a first threshold level of interference, the base station makes a determination that the selected channel is encumbered by interference from other devices.

In response to a determination that the selected channel is encumbered by interference from other devices, the base station sends database query for a channel assignment to the controller. This database query includes information indicating that the selected channel is encumbered. In response to this query, the base station obtains a channel assignment. In this case, because the database query includes information indicating that the selected channel is encumbered, the controller may configure the response so that the selected channel is not included in this channel assignment. The information indicating that the selected channel is encumbered may also be utilized by the controller to update/manage its SAS channel assignment database. The controller also may perform channel assignments to other base stations/networks under its management based on the information provided by the base station.

If the base station does not make a determination that the selected channel is encumbered, but the base station determines that the metric value is within a range between the first threshold level and a second threshold level that is lower than the first threshold level, the base station sends a database query to the controller without including any information indicating that the selected channel is encumbered, in response to this query, the base station obtains a channel assignment. In this case, because the database query does not include an indication that the selected channel is encumbered, the controller may configure the response to this query so that the selected channel is included or not included in the channel assignment. Whether or not the selected channel is included in the channel assignment depends on current information about the selected channel available to the controller from its channel assignment database. Alternately, if the base station determines that the value of the metric is at or below the second threshold value, the base station continues to operate using the first channel assignment without sending any new database query.

Another implementation includes a controller managing a SAS channel assignment database for a shared access system that includes multiple networks. In operation, the controller receives an initial database query from a base station requesting a channel assignment. In response to the database query, the controller generates a first registration in the database that indicates that a first at least one channel is assigned to the requesting base station and sends the identity of the first at least one channel to the base station as a channel assignment. The base station may then use the first at least one channel to communicate with one or more mobile devices. During operation of the base station, the controller may receive a subsequent database query from the base station, where this database query includes information indicating that a selected channel of the first at least one channel is determined by the base station to be encumbered. In response to the subsequent database query, the apparatus may send the identity of a second at least one channel to the base station as a second channel assignment and generate a second registration in a database, the second registration indicating that the second at least one channel is assigned to the base station. Because the subsequent database query includes information indicating that the selected channel is encumbered, the controller may configure the response to the subsequent database query so that the selected channel is not included in the second at least one channel. The controller may generate a temporary amendment in the SAS channel assignment database indicating that the selected channel is encumbered and manage channel assignments to other base stations/networks of the SAS system accordingly. The controller may perform a verification of the amendment and make the amendment permanent or remove the amendment from the SAS database based on the verification. The verification may include performing an accelerated synchronization of the SAS channel assignment database with one or more SAS databases of other SASs.

BRIEF DESCRIPTION OF THE DRAWINGS

FIG. 5 is a simplified block diagram showing an example mobile device;

FIG. 6 is a simplified block diagram showing an example controller; and,

FIG. 7 is a simplified block diagram showing an example base station.

DETAILED DESCRIPTION

Figure 1:
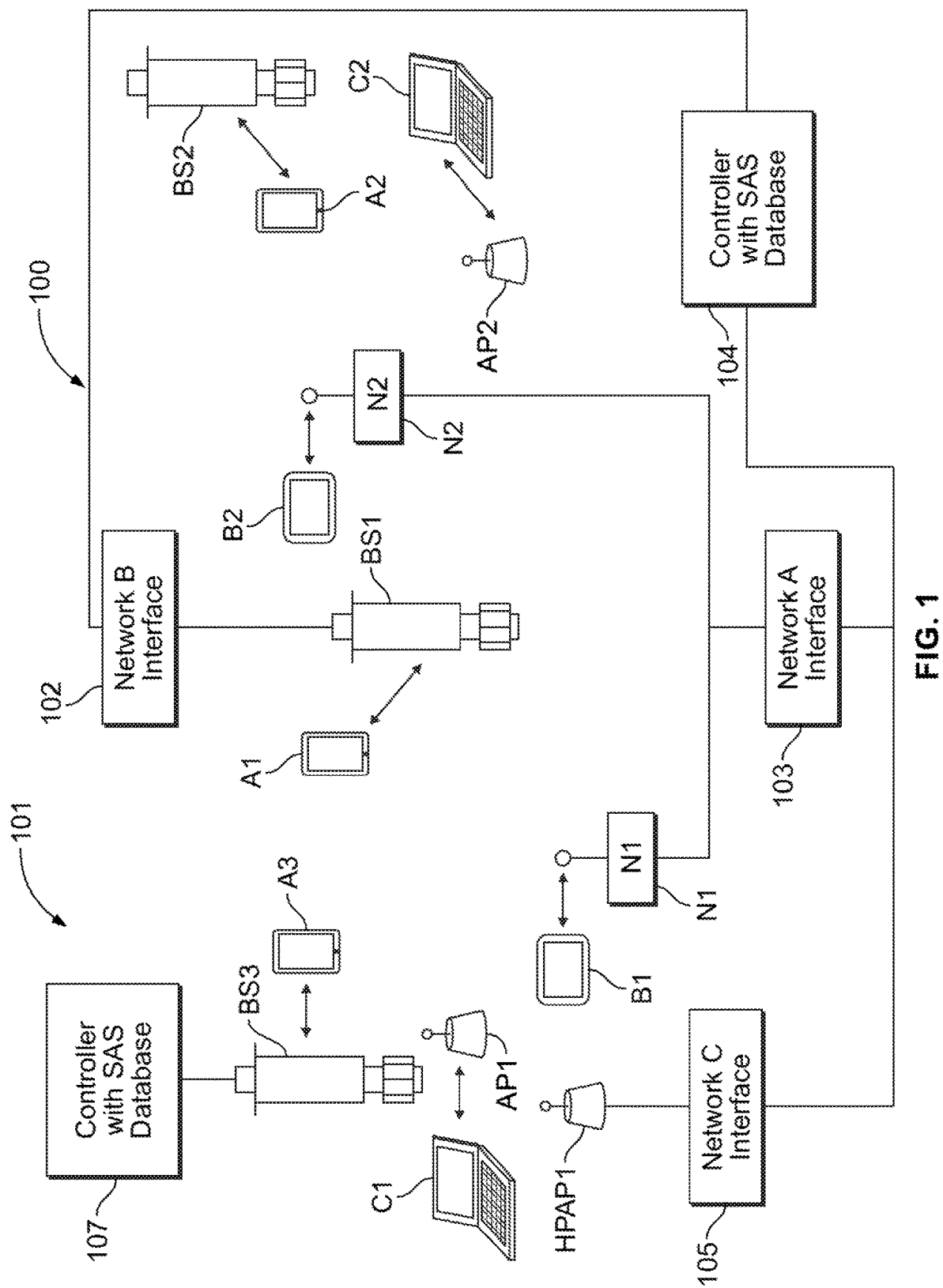
FIG. 1 is a diagram illustrating a system including example devices configured to operate according to an implementation.

The system, method and apparatus will now be described by use of example embodiments. The example embodiments are presented in this disclosure for illustrative purposes, and not intended to be restrictive or limiting on the scope of the disclosure or the claims presented herein.

The methods, systems, and apparatus of the embodiments provide technical advantages in a spectrum access system (SAS) in which one or more devices may send database queries for channel assignments to a controller of an SAS channel assignment database. An SAS of this type may be a multi-priority level system, for example, a 3-tier priority level system that includes spectrum users (networks and/or devices) that are each assigned one of three priority levels for use of channels within the shared spectrum. As used in this disclosure, the term channel means a portion or a band of frequency spectrum within which a network/device may transmit and receive signals. For example, a channel assignment to a network/device may comprise the assignment of one or more portions or bands of frequency spectrum within which the network/device may transmit and receive signals. The network/device may transmit and receive using any technology on frequency channels within the one or more portions or bands of frequency spectrum. In some implementations, the channel assignment may include channel numbers defined by a particular wireless standard.

The three priority levels of a SAS 3-tier system may include a tier-1 level that includes incumbent spectrum users, a tier-2 level that includes spectrum users who are each licensed to use a certain portion of spectrum, and a tier-3 level that includes users who are general allowed access (GAA) users. In the 3-tier system, when a tier-1 user is active on a channel x, proximity tier-2 and tier-3 users cannot use the same channel x. In the absence of an active tier-1 user on a channel x, a tier-2 user can use the channel x. In the case where a tier-2 user is using channel x, a tier-3 user cannot use channel x. A tier-3 user can only use channel x if there are no active tier-1 or tier-2 users on channel x.

Spectrum access management in a 3-tier SAS is accomplished by using a controller to manage an SAS channel assignment database. In a 3-tier SAS, since tier-1 devices are the incumbents and have highest priority in the spectrum for which they are incumbent, a tier-1 user does not need to request a channel assignment from the controller of the SAS channel assignment database. The tier-1 users may use the spectrum for which they are incumbent based on their own decisions, independently of the controller. Tier-1 users may or may not inform (register with) the controller of the SAS channel assignment database to inform the controller of the channels being used by the tier-1 users. Whether or not a tier-1 user informs the controller of its channel use depends on the system configuration. For example, if a tier-1 user is a department of defense (DOD) or Military related entity, the tier-1 user may not want to inform the controller of its channel usage for security reasons. In other cases, the controller operator may have agreements with tier-1 users that the tier-1 users will register their channel usage with the controller. In these cases, the registration of channel usage by tier-1 users may allow the controller to more efficiently manage channel assignments to tier-2 and tier-3 users.

In a 3-tier SAS, tier-2 and tier-3 users must send database queries to request channel assignments from the controller of an SAS database in order to use spectrum in the SAS. The database queries allow the controller of the SAS database to register the tier-2 and tier-3 users in the SAS database in order to manage and coordinate the spectrum usage according to a set of rules that avoids channel conflicts and interference. Implementations of the disclosure utilize the database queries of the tier-2 and/or tier-3 users of a 3-tier SAS to provide more efficient SAS operation.

In an implementation, a controller managing a SAS channel assignment database obtains current up-to-date information about assigned channels currently in use in the SAS from devices operating in the SAS. The devices used to determine the current information may be tier-2 or tier-3 devices of the SAS. The current information may comprise information on channel encumbrances caused by interference on the assigned channels. The term encumbrance is meant to include any type of interference or any type of condition that may exist to negatively affect transmission/ reception on a channel. An encumbered channel is a channel affected by any type of encumbrance.

In one implementation, the current information may also comprise information on the tier level of a device/system causing an encumbrance. Use of the devices operating on the assigned channels in the SAS to obtain the current information provides an advantage in that the current information determined by the devices may not be available yet to the controller. For example, the controller may not have yet synchronized its SAS channel assignment database with the channel assignment database in a remote system in which one or more of the same channels are assigned to devices in the remote system. Additionally, information related to channels assigned by remote systems may have become corrupted during synchronization, or may be otherwise lost to the SAS channel assignment database. In these cases, the devices in the remote system may be causing encumbrances on channels assigned by the controller.

A system incorporating the implementations provides advantages as compared to a SAS in which the controller of the SAS channel assignment database may only periodically communicate and/or synchronize with a regional cloud database that manages frequency spectrum for multiple SAS's. In a conventional approach, the local database and cloud database may have static entries that are only updated or synchronized over a relatively long time frame. The use of the relatively long time frame may preclude fine-grained management of frequency spectrum that would allow a controller to prevent interference over short time periods. The implementations allow current/up-to-date information on assigned channels, as determined by devices operating on the assigned channels, to be provided to a local database and/or a cloud database. A spectrum access system controller managing a local database may utilize this current up-to-date information to assign channels to the devices/base stations in a more efficient manner.

The controller may use the current information received from the devices to perform channel assignments or modify channel assignments for devices in one or more systems of the SAS in an efficient manner. The controller may also make amendments to the SAS channel assignment database based on the current information. Use of the modified channel assignments and amendment of the channel assignment database may reduce interference in the one or more systems in which the controller is implemented. Use of the modified channel assignments and amendment of the registration/channel assignment database may also reduce interference in other systems caused by the system in which the controller is implemented.

An advantage may also be provided by the controller being triggered to perform additional operations to verify the current information received from a device. For example, in an implementation in which the current information comprises an indication that a device has determined that a channel is encumbered by another device, the controller may perform an accelerated synchronization of its SAS channel assignment database with another channel assignment database located in another system. The controller may then receive a verification that the channel is actually in use by another device in the other system. This accelerated verification operation may prevent the controller from assigning the encumbered channel during the time period between scheduled synchronizations of the SAS channel assignment database and the channel assignment database in the other system.

Use of the methods, systems, and apparatus also provides more efficient operation of the individual devices in a SAS system that send a database queries for channel assignment to a controller that is managing the SAS channel assignment database. In an implementation the device may be a base station. As used in this disclosure, the term base station is meant to include any type of base station, such as a cellular base station, access point, transmitter station, or other type of apparatus/device that provides a communications interface between a network and a wireless device.

The sending of the database query may be triggered by the monitoring of the value of a metric measured on a selected channel assigned to the base station. The metric may be any parameter that provides an indication that the selected channel may be encumbered. For example, the metric may include measurements of the power level of interfering transmissions on the selected channel. In other examples, the metric also may include any other type of measurements that may indicate encumbrances on the selected channel such as bit error rate/packet error rate, channel throughput, or other quality of services (QoS) related parameters. The amount and type of information that is included in the database query may be based on the value of the metric. The database query triggered by the monitoring of the metric provides an advantage over a SAS system in which database queries are sent only on a predetermined or regular time schedule. Because the database query is triggered by the monitoring of the metric, action may be taken to remove, avoid, or prevent channel encumbrances or channel conflicts, based on the current situation at the base station, without waiting for regularly scheduled system level synchronizations or database updates.

If the value of the metric is at or above a first threshold level that indicates a high level of encumbrance, the base station may send a database query including an indication that the selected channel is likely encumbered by use from another device. The controller may then respond with an assignment of different channels to the base station. The base station is advantageously freed from operating on the selected channel. Additionally, the controller may advantageously utilize the indication of encumbrance to amend/modify its database through appropriate action, if needed, for more efficient system operation.

If the value of the metric indicates an intermediate level of encumbrance (below the first threshold value but still above a second threshold value), the device may send an accelerated normal database query for channel assignment to the controller. The controller may then respond to the database query with an assignment of channels based on current information in its database. If the assignment of channels received in response to the query includes the selected channel, the device may continue to use the selected channel as long as the value of the metric indicates an intermediate level of encumbrance. Alternately, the device may switch to a clearer channel that is included in the assignment of channels. If the assignment of channels received in response to the query does not include the selected channel, the selected channel has been assigned to another device by the controller, and the device may use another channel included in the assignment of channels. The triggering of a database query based on the value of the metric indicating encumbrance at an intermediate level provides a double check that the selected channel is not being used by another device.

The implementations also have applicability to systems such as long term evolution-unlicensed (LTE-U) systems, systems utilizing frequency spectrum in the television white space (TVWS), dynamic spectrum access (DSA) systems, and other systems in which frequency spectrum is shared based on a channel assignment database.

FIG. 1 shows a spectrum access system 100 that includes three networks. Network A includes devices N1, N2, B1, and B2, and network A interface 103. Network B includes devices BS1, BS2, A1, and A2, and network B interface 102. Network C includes devices AP1, AP2, C1, and C2, and network C interface 105 that includes high power access point HPAP1. Devices BS1 and BS2 may be base stations configured as cellular base stations and devices A1 and A2 may be mobile handsets or similar devices operating in a cellular network comprising network B. Devices N1 and N2 may be base stations configured as wireless access nodes (functioning as base stations or access points) for a private/public service network comprising network A, and devices B1 and B2 may be tablet computers or similar devices operating in the private/public service network A. Devices AP1 and AP2 may be base stations configured as Wi-Fi access points of a business/organizational local area network (LAN) comprising network C, and devices C1 and C2 may be laptop computers or similar devices operating in the LAN network. FIG. 1 also shows system 101 that includes base station BS3 and mobile handset A3. System 101 may be located remotely from networks A, B, and C. Networks A, B and C are each shown communicating with a controller 104 which includes a spectrum access system (SAS) database. Base station BS3 is shown communicating with a controller 107 which includes a SAS database for system 101. While devices A1, A2, N1, N2, C1, and C2 are shown as particular types of mobile devices, in other implementations each of these devices may be configured as any other type of wireless device, such as a mobile phone, a laptop, a tablet device, a gaming/media device, a personal computer, or any other type of wireless device.

Figure 2:
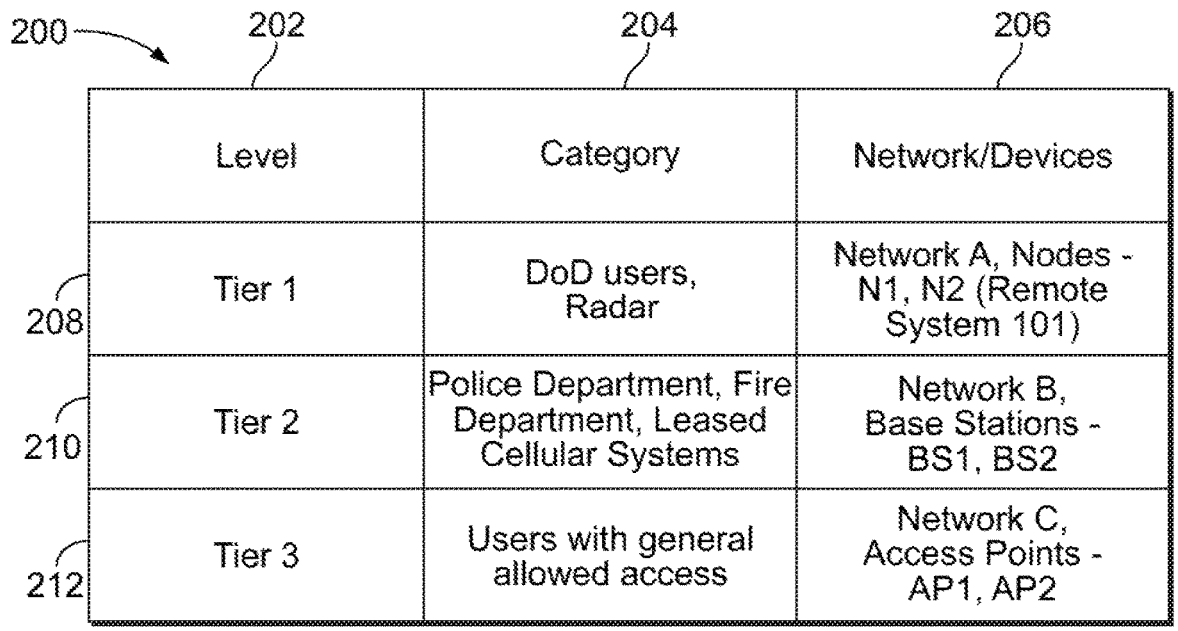
FIG. 2 is a table illustrating example tier levels of networks/devices in the system of FIG. 1.

Networks A, B, and C of spectrum access system 100 may be each be implemented as assigned to a tier level of a 3-tier level spectrum sharing system. FIG. 2 is a table 200 showing example tier level assignments for an implementation of spectrum access system 100. Table 200 includes columns for tier levels 202, categories 204, and network/devices 206. Table 200 also includes corresponding rows for tier level 1 206, tier level 2 210, and tier level 3 212. Row 208 shows devices (nodes) N1 and N2 of network A assigned to tier 1 (highest priority), row 210 shows devices (base stations) BS1 and BS2 of network B assigned to tier 2 (medium priority), and row 212 shows devices (access points) AP1 and AP2 of network C assigned to tier 3 (lowest priority). Row 208 also shows that remote system 101 is assigned to tier 1. Column 204 shows example categories of users for each tier level. Tier 1 users/networks may be in the category of high priority users such as radar systems and Department of Defense (DoD) users. Tier 2 users networks may be in the category of intermediate priority users such as police departments, fire departments, or licensed cellular systems. Tier 3 users/networks may be in the category of other users with general allowed access. For example, tier 3 users may be local access networks (LANs) of businesses or other organizations.

In this 3-tier system, when a tier-1 user (network or base station) is active on a channel x, proximity tier-2 and tier-3 users cannot use the same channel x. In the absence of an active tier-1 user on a channel x, a tier-2 user can use the channel x, in this case, a tier-3 channel cannot use channel x. A tier-3 user can only use channel x if there are no active tier-1 and tier-2 users on channel x. The overall management of spectrum access system 100 according these 3-tier rules is performed by controller 104.

In an implementation of FIG. 1, each of the tier-2 level base stations BS1 and BS2 of network B may send a query for a channel assignment to controller 104 through network B interface 102. Controller 104 responds to the query by sending a channel assignment of one or more channels to each base station BS1 and BS2 based on base stations BS1 and BS2 having tier 2 level priority and the locations of BS1 and BS2. Also, each of the tier 3 level access points AP1 and AP2 of network C may send a query for a channel assignment to controller 104 through high power access point APAP1 and network C interface 105. Controller responds to the query by sending a channel assignment of one or more channels to each access point AP1 and AP2 based on access points AP1 and AP2 having tier 3 level priority and the locations of AP1 and AP2. Access nodes N1 and N2 of network A are tier 1 devices that have a highest priority for use of designated spectrum that is within the spectrum usable in spectrum access system 100. Access nodes N1 and N2 may use the designated spectrum for communication with tablet computing devices B1 and B2 without permission or assignment from controller 104. In the implementation of FIG. 1, access nodes N1 and N2 may send information through network A interface 103 to controller 104 that informs controller 104 of channels that are being used in network A. Controller 104 may then use the information received from nodes N1 and N2 when assigning channels to devices in network B and network C.

In other implementations of spectrum access system 100, one or more of the network interfaces may include a controller that sends a query for channel assignment on behalf of all the devices in its network and allocates the assigned channels to the individual devices itself. For example, network interface B may be implemented with a controller that sends a query to controller 104 for a channel assignment to network B. When controller 104 responds with a channel assignment based on network B having a tier2 level priority and the location of network B, the controller in network interface B may then allocate the channels assigned to network B to the individual base stations BS1 and BS2.

Figure 3A:
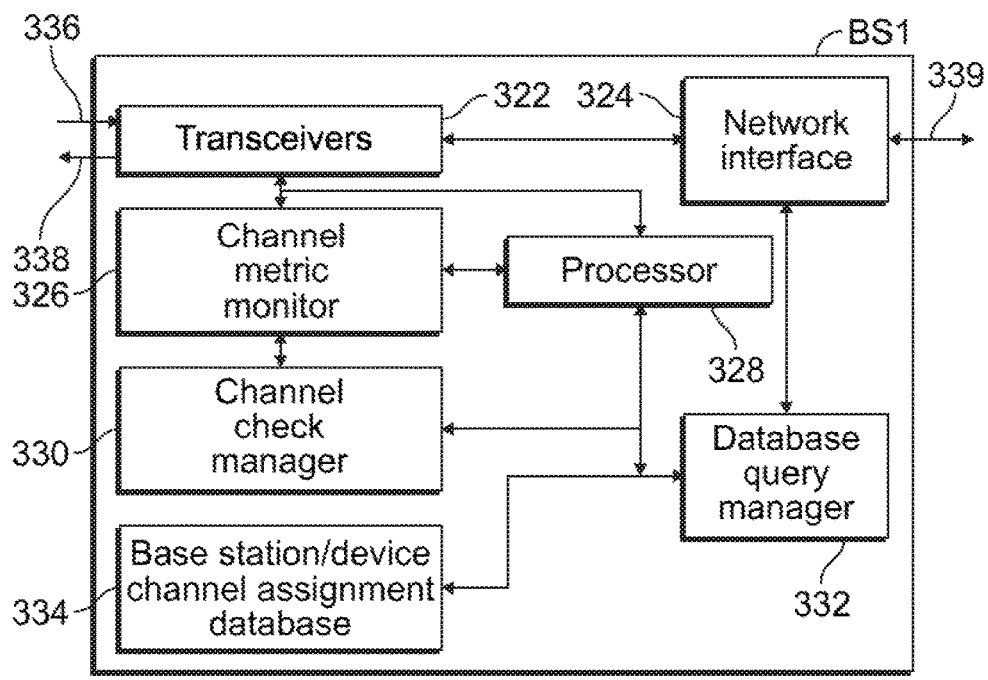
FIG. 3A is a diagram illustrating portions of an example base station in a shared frequency spectrum system.
Figure 3B:
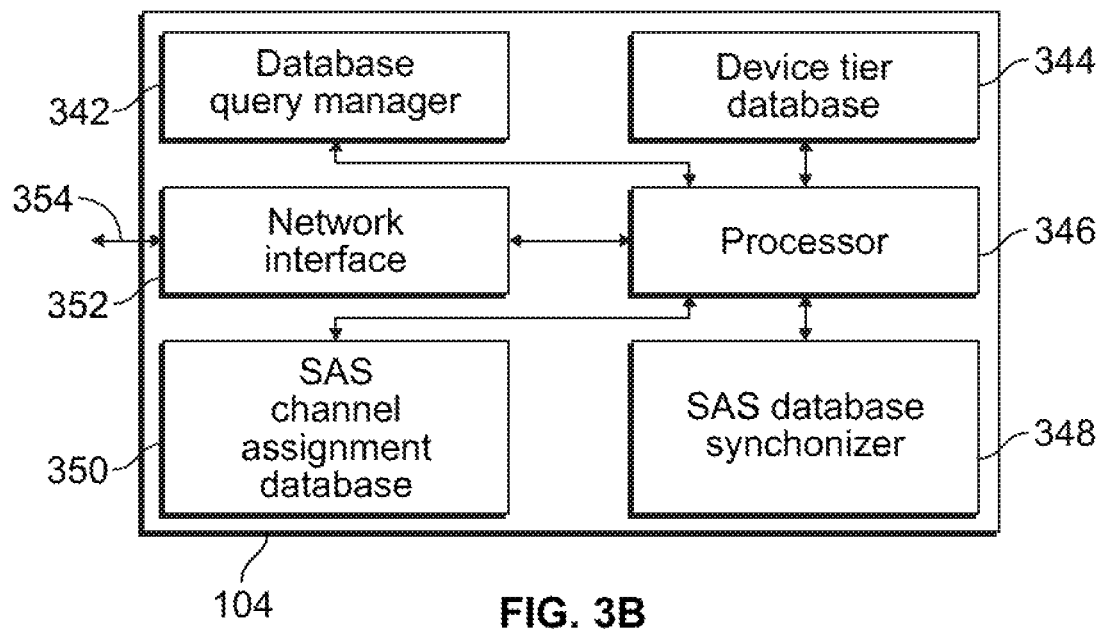
FIG. 3B is a diagram illustrating portions of an example controller in a shared frequency spectrum system.
Figure 3C:
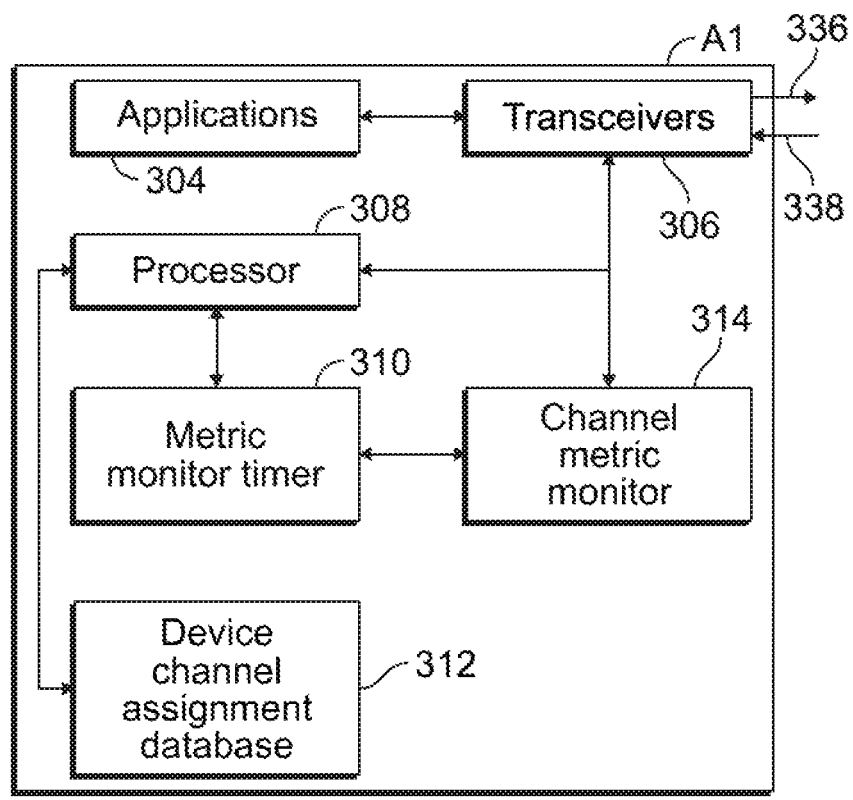
FIG. 3C is a diagram illustrating portions of an example mobile device in a shared frequency spectrum system.

FIGS. 3A-3C are diagrams illustrating portions of example devices in a shared frequency spectrum system. FIG. 3A shows functional portions of base station BS1 of FIG. 1. Base station BS1 may include processor 328, transceivers 322, network interface 324, channel metric monitor 326, channel check manager 330, database query manager 332, and base station/device channel assignment database 334. FIG. 3B shows functional portions of controller 104 of FIG. 1. Controller 104 may include database query manager 342, device tier database 344, network interface 352, processor 346, SAS database synchronizer 348, and SAS channel assignment database 350. FIG. 1C shows functional portions of mobile handset A1 of FIG. 1. Mobile handset A1 may include applications 304, transceivers 306, processor 308, metric monitor timer 310, channel metric monitor 314, and device channel assignment database 312. The operations of the portions of base station BS1, mobile handset A1, and controller 104 shown in FIGS. 3A-3C may be explained in relation to the flow diagrams of FIGS. 4A and 4B.

Figure 4A:
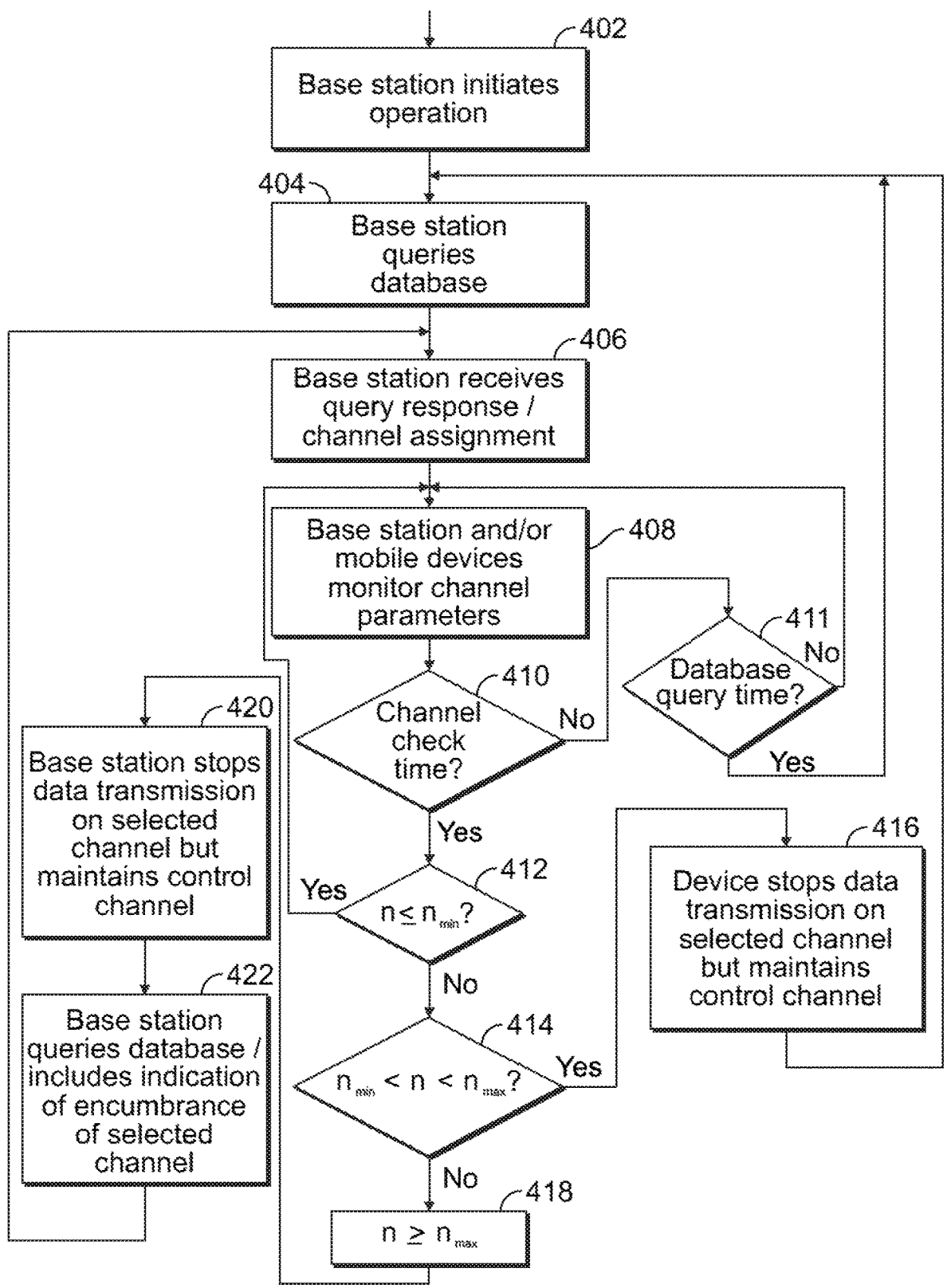
FIG. 4A is a flow diagram illustrating operations performed by an example base station operating on assigned channels in a shared frequency spectrum system.

FIG. 4A is a flow diagram illustrating example operations performed by an example base station according to an implementation of the disclosure. FIG. 4A may be explained using a scenario in which base station BS1 interacts with controller 104 in spectrum access system 100.

The process begins at 402 where base station BS1 initiates operation in network A. At 404, base station BS1 sends a database query to controller 104 for a channel assignment as a tier 2 device operating in network B. Processor 328 of base station BS1 may control database query manager to configure the database query and send the database query through network interface 324 over link 339 to controller 104 via network A interface 102.

At 406, base station BS1 receives a query response at network interface 324 on link 339 that includes a channel assignment identifying at least one channel that controller 104 has assigned to base station BS1. Database query manager 332 processes the channel assignment and stores the identity of the assigned channels in base station/device channel assignment database 334. Processor 328 then uses the base station/device channel assignment database 334 to assign channels to handset A1 for communications with base station BS1 by communicating/negotiating channel assignments with mobile handset A1 322 on uplink 336 and downlink 338 through transceivers 322. Processor 328 may interact with processor 308 of mobile handset A1 to assign the one or more channels. In the example of FIG. 4A, at least one uplink channel and at least one downlink channel may be assigned for communications between base station BS1 and mobile handset A1. Base station BS2 of FIG. 1 may function in a similar manner to base station BS1 to obtain channel assignments for operation in network B as a tier 2 device, and assign channels to handset A2 for communications with base station BS2. Also, access points AP1 and AP2 of FIG. 1 may function in a similar manner to base station BS1 to obtain channel assignments for operation in network C as tier 3 devices. Controller SAS database 104 will assign channels to base stations BS1 and BS2, and access points AP1 and AP2, based on their relative priorities as tier 2 and tier 3 devices.

At 408, base station BS1 and/or mobile handset A1 monitor channel parameters on the assigned channels on which base station BS1 and mobile handset A1 communicate with one another. In monitoring the channel parameters, channel metric monitor 326 of base station BS1 may sample a signal on at least one channel on the uplink 336 at transceiver 322 and channel metric monitor 314 of handset A1 may sample a signal on at least one channel on the downlink 338 at transceiver 306.

During the monitoring at 408, base station BS1 may generate N parameter samples ($S_1, \ldots S_N$) for each at least one channel on the uplink 336, and handset A1 may generates N parameter samples ($S_1, \ldots S_N$) for each at least channel on the downlink 338. The samples may be normally uniform samples and the number of samples may be fixed. Metric monitor timer 310 of Handset A1 may cause controller 308 to control channel metric monitor 314 to send the series of N parameter samples for the at least one channel on the downlink to channel metric monitor 326 of base station BS1 at selected times. In an implementation, the N parameter samples may comprise power level measurements of interference on the assigned channels. In other implementations, the N parameter samples may comprise any other type of measurements that may indicate encumbrances on the selected channel such as bit error rate/packet error rate, channel throughput, or other quality of services (QoS) related parameters.

At 410, processor 328 of base station BS1 determines if a channel check has been triggered. A channel check may be triggered by channel check manager 330. Channel check manager 330 may trigger a channel check based on a timer. The timer may run for monitoring intervals and at the expiration of each monitoring interval a selected channel of the least one channel on the uplink or the at least one channel on the downlink may be selected for a channel check. In another implementation the channel check may involve performing simultaneous channel checks on more than one channel of the at least one channel on the uplink and/or at least one channel on the downlink.

If a channel check has not been triggered, the process moves to 411. At 411, processor 328 determines if it is time for another database query. Base station BS1 may be configured so that a new database query for a channel assignment is sent to controller 104 at regular intervals in order to keep the channels assigned to BS1 up to date with any changes in controller 104. If, at 411, it is time for another database query, the process returns to 404. At 404, processor 328 of base station BS1 controls database query manager 332 to configure a new database query for channel assignment and send the database query through network interface 324 on link 339 to controller 104 via network A interface 102. From 404 the process continues as described previously. If, at 411, it is determined that it is not time for another database query, the process returns to 408 where base station BS1 and/or mobile handset A1 continue to monitor channel parameters on the assigned channels until it is time for a channel check.

If, at 410, processor 328 determines that a channel check has been triggered, processor 328 determines a metric using the N samples ($S_1, \ldots S_N$) for the selected channel that were generated by channel metric monitor 326 during the channel monitoring time period. The metric for the selected channel may be determined at 410 from the samples as a value n, where n is represented by:

$$n = \frac{1}{N} \sum_{i=1}^{N} |S_i|^2$$

The metric n may comprise a power measurement determined from the N samples that indicates a level of interference on the selected channel as measured by base station BS1 or mobile handset A1 on the uplink or downlink, respectively. In other implementations, the metric also may comprise any other type of measurement that may be represented by the N samples ($S_1, \ldots S_N$) for the selected channel, such as bit error rate/packet error rate, channel throughput, or other quality of services (QoS) related parameters. In an implementation, processor 328 may also determine information associated with the metric in addition to the metric value. The information associated with the metric may comprise an estimation of the type of signal that is causing any interference or encumbrance present on the selected channel. This may be estimated from known signal structures of the systems remote to spectrum access system 100. In the example implementation of FIG. 1 in which base station BS1 is a tier 2 device, channel metric monitor 326 may analyze the N samples of the selected channel based on a signal structure used by tier 1 networks and a signal structure used by tier 3 networks. Processor 328 may make an estimation of whether interference or encumbrance on the selected channel is caused by a tier 1 device or a tier 3 device. For example, tier 1 device base station BS3 may be transmitting on the selected channel in remote system 101 at the same time the channel is assigned to base station BS1 in spectrum access system 100. In this scenario, based on the known signal structure used by tier 1 device base station BS3, an estimate may be made that an interference/encumbrance determined at 410 is caused by a tier 1 device and reported with the database query. In an alternative implementation, base station BS1 may be configured to send a database query only if the interference is caused by a tier 1 device. In this alternative implementation, base station BS1 would ignore interference from a tier 3 device and not transmit any data query.

At 412, processor 328 determines if $n \leq n_{min}$ for the selected channel. If it is determined that $n \leq n_{min}$ for the selected channel, the process moves back to 408. At 408, base station BS1 and/or mobile handset A1 continue the operation of monitoring channel parameters on the assigned channels during communications with one another. If, at 412, it is determined that n>$n_{min}$ for the selected channel, the process moves to 414.

At 414, processor 328 determines if $n_{min}$<n<$n_{max}$ for the selected channel. If it is determined that $n_{min}$<n<$n_{max}$, the process moves to 416. At 416, base station BS1 stops sending data on the selected channel but maintains the current control channel. From 416 the process moves back to 404. At 404, controller 328 of base station BS1 controls database query manager 332 to configure a new database query for a channel assignment and send the database query through network interface 324 on link 339 to controller 104 via network A interface 102. In response to the database query, base station BS1 receives a new channel assignment from controller 104. Database query manager 332 processes the channel assignment and stores the identity of the assigned channels. In the scenario where operation 404 is entered from operation 416, the new channel assignment may or may not include the selected channel that was being checked at 414. If the new channel assignment includes the selected channel, base station BS1 may continue to assign the selected channel to handset A1 to use in communications with base station BS1, or base station BS1 may assign another available channel to handset A1.

If, at 414, it is determined that n is not of a value n, where $n_{min}$<n<$n_{max}$, the process moves to 418. At 418, processor 328 determines that n≥$n_{max}$. From 418 the process moves to 420. At 420, processor 328 controls base station BS1 to stop data transmission on the selected channel while maintaining the current control channel. At 422, Controller 328 of base station BS1 controls database query manager 332 to configure a new database query for channel assignment that includes information indicating that the selected channel is encumbered and sends the database query through network interface 339 to controller 104. From 422, the process moves back to 406. At 406, base station BS1 receives a new channel assignment from controller 104 identifying at least one channel that controller 104 has assigned to base station BS1. Because the database query included an indication of encumbrance for the selected channel the new channel assignment received from controller 104 does not include the selected channel. The process then continues on from 406 to 408.

In an example implementation in which processor 328 has determined additional information associated with the metric at 410, the information indicating that the selected channel is encumbered sent with the database query at 422 may include this additional information. For example, the new database query for channel assignment configured by base station BS1 at 422 that includes information indicating that the selected channel is encumbered may include additional information comprising an identification/estimation that a tier 2 or tier 1 device is causing the encumbrance on the selected channel.

The process of FIG. 4A allows base station BS1 and/or handset A1 to provide information about the encumbrance of the selected channel to controller 104 that may not be available to controller 104 from other sources. Base station BS2 and access points AP1 and AP2 of FIG. 1 may also function in a similar manner to base station BS1 to provide information about channel encumbrances to controller 104. The information about the encumbrances may then be used by controller 104 for more efficient management of channel assignments in networks B and C.

Figure 4B:
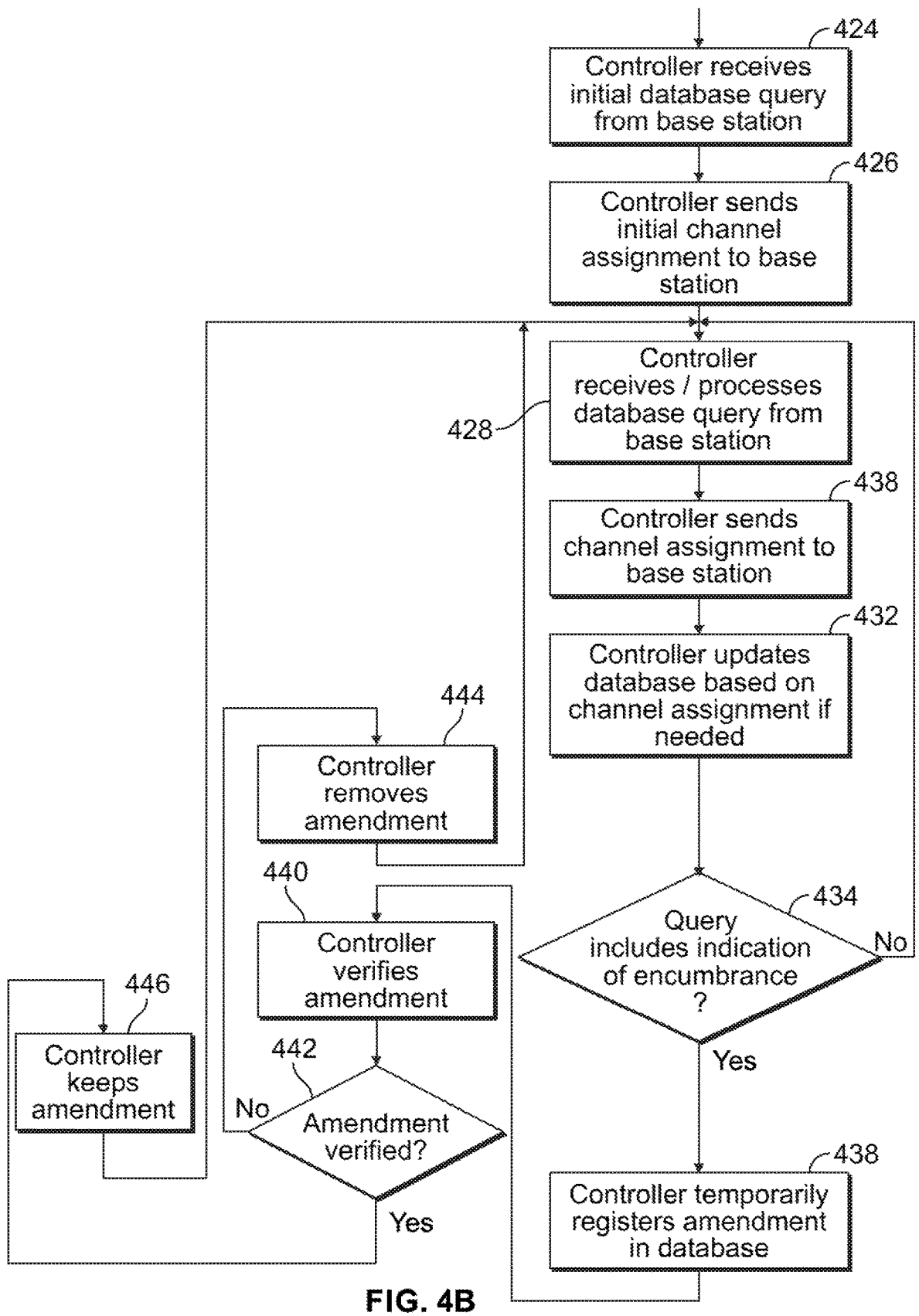
FIG. 4B is a flow diagram illustrating operations performed by an example controller assigning channels in a shared frequency spectrum system.

FIG. 4B is a flow diagram illustrating example operations performed by an example controller according to an implementation of the disclosure. Controller 104 may perform the operations of FIG. 4B. FIG. 4B may be explained using a scenario in which controller 104 interacts with base station BS1 operating according to FIG. 4A in spectrum access system 100.

The process begins at 424 where controller 104 receives a message comprising an initial database query from base station BS1. Processor 346 receives the database query at network interface 352 on link 354 and provides the database, query to database query manager 342. Database query manager 342 then processes the database query using information in SAS channel assignment database 350 and device tier database 344 to generate a channel assignment for base station BS1. Based on the channel assignment, processor 346 generates a registration in SAS channel assignment database, indicating that at least one channel is assigned to base station BS1.

At 426, controller 104 sends the identity of the at least one channel in the channel assignment to base station BS1 in a query response. From 426 the process moves to 428. Base station BS1 may then operate according to FIG. 4A, using the channel assignment sent by controller 104 at 426.

During its operation, base station BS1 may send messages comprising additional database queries to controller 104 as it performs the operations of FIG. 4A. These database queries will be received by controller 104 at 428. Depending upon where in the process of FIG. 4A base station BS1 generates the database query, one or more of the database queries may include information indicating an encumbrance of a selected channel. Also, in an implementation in which BS1 is configured to identify or estimate the type or tier level of the device causing the encumbrance on the selected channel, the information indicating an encumbrance of a selected channel may also include an identification/estimation of the tier level of the device causing the encumbrance on the selected channel. In alternative implementations, the database query and information of encumbrance may be sent to controller 104 in separate messages at different times.

At 428, controller 104 receives and processes a database query from base station BS1. Processor 346 receives the database query from network interface 352 and provides the database query to database query manager 342. Database query manager 342 then processes the database query using information in SAS channel assignment database 350 and device tier database 344 to generate a new channel assignment for base station BS1.

As part of the processing of the database query received at 428, database query manager 342 checks whether any information indicating an encumbrance of a selected channel was included with the database query. For example, if base station BS1 sent the database query received at 428 while performing operation 422 of FIG. 4A, information indicating an encumbrance of a selected channel of the channels assigned to base station BS1 would have been included in the database query, in response to the query, database query manager 342 generates a channel assignment for base station BS1 based on whether or not information indicating an encumbrance is included in the database query. If the database query included an indication that a selected channel is encumbered, database query manager generates a channel assignment for base station BS1 that does not include the selected channel indicated to be encumbered. If the database query does not include an indication that a selected channel is encumbered, database query manager generates a channel assignment for base station BS1 that may or may not include the selected channel indicated to be encumbered, depending on the current contents of network/device channel assignment database 350.

At 430, processor 346 sends the identity of at least one channel in the new channel assignment generated at 428 to base station BS1 through network interface 352 on link 354. At 432, processor 346 generates a registration in SAS channel assignment database 350 based on the new channel assignment that indicates that the at least one channel in the new channel assignment is assigned to base station BS1.

At 434, processor 346 determines if the database query included information indicating an encumbrance of a selected channel. If the database query did not include an indication of encumbrance of a selected channel, the process moves back to 428 to again wait for a next database query. If the database query included information indicating an encumbrance of a selected channel, the process moves to 438.

At 438, processor 346 generates a temporary amendment in SAS channel database 350 indicating that the selected channel is encumbered and likely in use by a second device. This effectively prevents the selected channel from being assigned to other networks devices in spectrum access system 100 while the amendment is temporarily in place. In the implementation, in which the information indicating an encumbrance of a selected channel also includes an identification/estimation of the tier level of the device causing the encumbrance on the selected channel, processor 346 includes the estimated tier level of the device as part of the an amendment. In this case, processor 346 may use this tier level estimation when assigning channels from the SAS database 350. In another implementation, processor 346 may only generate the temporary amendment if base station BS1 is a qualified device. In this implementation, processor 346 may check to see that base station BS1 is of a device type that is qualified in spectrum access system 100 to provide information on channel encumbrances. For example, spectrum access system 100 may set minimum requirements on the capabilities of devices to perform accurate measurements to determine if encumbrances exist. If the devices are portable and moved between different systems, one system may have more stringent requirements than another system on what constitutes a qualified device.

Next, at 440, processor 346 verifies the amendment made at 438 by verifying whether or not the selected channel is encumbered according to information available to controller 104 independent of the information received from BS1.

To verify the amendment, processor 346 may initiate an accelerated synchronization with other relevant databases that may have information on the source of the encumbrance on the selected channel. If the synchronization with the other relevant database indicates the selected channel is registered as assigned to another device/system in another database, the amendment is considered verified. The accelerated synchronization may be performed immediately, allowing controller to obtain current information without waiting for a scheduled synchronization time. This provides an advantage where normal synchronizations may only be performed, for example, on a regularly scheduled 24 hour basis. For example, in an implementation of FIG. 1, processor 346 may control SAS database synchronizer 348 to initiate synchronization through network interface 352 over link 354 with remote SAS database 105 in system 101. In a scenario where the encumbrance on the selected channel is caused by base station BS3 in remote system 101, the synchronization at 440 would provide information to processor 346 that the selected channel has been registered in remote SAS database 105 as assigned to base station BS3 in system 101 since the last synchronization with remote SAS database 105. In other implementations, the verification at 440 may be performed by processor 346 polling other databases, such as SAS channel assignment database 350, to verify whether or not the selected channel is in use by another device/system. In a further implementation, processor 346 may hold the temporary amendment in the database until one or more relevant regularly scheduled synchronizations with other databases are performed. For example, processor 346 may wait for a predetermined time period after the generation of the amendment, where the time period is long enough so that one or more synchronizations with other databases falls within the time period. If no information indicating that the selected channel is in use is received during the time period, processor 346 may remove the amendment from the database.

At 442, processor 346 determines if the amendment was verified at 440. If the amendment was verified, the process moves to 446. At 446, processor 346 keeps the amendment by changing the temporary amendment to a registration of the selected channel to system 101 in SAS channel assignment database 350. If the amendment was not verified at 440, processor 346 removes the temporary amendment from network/device channel assignment database 350 to free up the selected channel for further assignment from controller 104. From 440 the process returns to 406.

In implementations, in which the information indicating an encumbrance of a selected channel also includes an identification/estimation of the tier level of the device causing the encumbrance, the tier level estimation may be used in the verification at 440. For example, tier 1 devices/ networks in spectrum access system 100 or neighboring systems may not report all channel usage to controller 104 or another channel assignment database that may be synchronized with controller 104. In these cases, the amendment made at 438 may be verified at 440, and kept in SAS channel database 350 at 446, on the basis that the interference/encumbrance on the selected channel is caused by a tier level 1 device/network that would not otherwise report the encumbrance. This informs controller 104 of channel use by tier level 1 systems that may interfere with spectrum access system 100.

In further implementations, the operation of base station BS1 and controller 104 may be enhanced by utilizing machine learning techniques to process information indicating encumbrances of channels, where the information is collected over time from monitoring performed at base station BS1 or, in the case of controller 104, from base station BS1 and other devices.

For example, controller 104 may track tier 1 level encumbrances over time as indicated in database queries received from bases stations BS1 and BS2 of network B and access points AP1 and AP2 of network C. If machine learning processes in controller 104 determine that tier 1 encumbrances determined in networks B and C occur on a particular set of channels on a periodic or predictable basis based on a pattern, controller 104 may stop assigning channels of that set of channels to networks B and C during time period in which the encumbrances occur. This may be useful in situations in which a tier 1 level system that does not report its channel usage to any database uses the set of channels at a certain time of day or of the week. For example, the tier 1 level system may a governmental agency or DoD system that utilizes communications with ships, satellites or planes that move near or over the location of networks B and C on a predictable basis.

In other implementations, the machine learning process performed by controller 104 may also include a correlation of predicted encumbrances of the plurality of channels with at least one event. In these implementations, indications of encumbrances and/or predicted encumbrances may be correlated with events. For example, an occurrence of an earthquake or a forecast of extreme weather may be predicted to trigger heavy use of certain tier-2 channels by tire trucks, ambulances, police, and other emergency services. Also, in an area near where events such as military equipment demonstrations and/or maneuvers may often occur, a set of tier-1 channels may be used more heavily during the event. In these types of scenarios, controller 104 may receive information on the occurrence of events and modify its channel assignments accordingly.

In another example, controller 104 may track tier level 1 encumbrances over time, and machine learning processes in controller 104 may create a ranking for channels of a channel set that controller 104 may assign to networks B and C. The milking may assign a relative rank to each channel of the channel set that indicates a preference for allocation for use by networks B and C. For example, channels that are never encumbered may be assigned a high ranking and channels that are often encumbered may be assigned a low ranking. Controller 104 may then assign channels of the set of channels with a preference for assigning any available higher ranking channels first to networks B and/or C. The ranking may be updated and modified over time as network conditions change.

In a further example, controller 104 may track encumbrances reported over time from network B and/or network C and machine learning processes in controller 104 may determine how particular channel assignment allocations among devices of network B and/or network C cause interference within or between the networks B and C. The machine learning processes in controller 104 may then configure channel assignment schemes to minimize the interference within network B or C, or between the networks B and C.

In another example implementation of machine learning, the machine learning processes may be implemented in base station BS1. Base station BS1 may receive a channel assignment of at least one channel from controller 104 and use only the channels in the assignment that are cleared by its machine learning processes based on previous channel analysis. If none of the channels are cleared for use, base station BS1 may send a database query including an indication of encumbrance of the at least one channel to controller 104, so that controller 104 may temporarily register the at least one channel as being encumbered at the tier inferred by machine learning. Controller 104 may perform verification of the encumbrance of the at least one channel. In another example, base station BS1 may utilize information communicated to it about channel encumbrance from other base stations such as base station BS2 through peer communication in machine learning processes.

FIG. 5 is a simplified block diagram of an example mobile device 500 that may be implemented in a spectrum access system. Mobile device 500 represents an example implementation of mobile handset A1 that was described in relation to FIGS. 1, 3C and 4A. Mobile device 500 includes processor 504, transceivers 502, user interface (UI) 506, and memory 508 that includes code and programs/instructions for applications 512, channel metric monitoring programs 514, metric monitor timing programs 516, and channel assignment programs 518. Memory/storage 508 also includes code and programs/instructions for operating system (OS) 510 that control overall operation of mobile device 500. In an implementation, execution of channel metric monitoring programs 514 and metric monitor timing programs 516 causes processor 504 to implement operations that cause mobile device 500 to perform monitoring of at least one downlink channel to generate the N parameter samples ($S_1, \ldots S_N$) and the sending of the N parameter samples ($S_1, \ldots S_N$) to base station BS1 as described for operation 408 of FIG. 4A. Execution of channel assignment programs 518 causes processor 504 to implement operations that cause mobile device 500 to transmit and receive communications with base station BS1 on channels according to channel assignments received from base station BS1.

FIG. 6 is a simplified block diagram showing an example controller 600 that may be implemented in a spectrum access system. Controller 600 represents an example implementation of controller 104 that was described in relation to FIGS. 1, 3B and 4B. Controller 600 includes processor 602, network interface 601, and memory/storage 604 that includes code and program/instructions for channel assignment programs/database 606, database query interaction programs 608, device tier database 610, database verification control programs 612, and machine learning programs/database 614. Controller 600 may connect though network interface 601 to a backend network that connects to a network interface such as network B interface of FIG. 1. Network interface 601 may be any type of interface, wireless or otherwise, to a network, for example the internet.

In an implementation, execution of channel assignment programs/database 606, database query interaction programs 608, device tier database 610, and database verification control programs 612 causes processor 602 to implement operations that cause controller 600 to operate according to the operations described for controller 104 in relation to FIG. 4B. In an implementation in which controller 600 utilizes machine learning, execution of machine learning programs in machine learning programs/database 614 may cause controller 600 to implement operations to process information indicating encumbrances of channels and utilize the processed information in performing channel assignments.

FIG. 7 is a simplified block diagram showing an example base station 700 that may be implemented in a spectrum access system. Base station 700 represents an example implementation of base station BS1 that was described in relation to FIGS. 1, 3A and 4A. Base station 700 includes processor 704, network interface 702, transceivers 716, and memory/storage 706 that includes code and program/instructions for channel metric monitoring programs 708, channel check programs 710, channel assignment control programs 712, and database query interaction programs 714. Base station 700 may connect though a backend network to a controller with an SAS database such as controller 104 of FIG. 1 over network interface 702. Network interface 702 may be any type of interface, wireless or otherwise, to a network, for example the internet. Processor 704 may comprise one or more processors, or other control circuitry or any combination of processors and control circuitry that provide overall control of base station 700 according to the disclosed embodiments. Transceivers 716 provide the capability to communicate with devices such as mobile device A1 over channels 718. Memory 706 may be implemented as any type of as any type of computer readable storage media, including non-volatile and volatile memory.

In an implementation, execution of channel metric monitoring programs 708, channel check programs 710, channel assignment control programs 712, and database query/interaction programs 714 causes processor 704 to implement operations that cause base station 700 to operate according to the operations described for base station BS1 in relation to FIG. 4A.

Processors 504, 602, and 704 may comprise one or more processors, or other control circuitry or any combination of processors and control circuitry that provide functions according to the disclosed embodiments.

The example embodiments disclosed herein may be described in the general context of processor-executable code or instructions stored on memory that may comprise one or more computer readable storage media (e.g., tangible non-transitory computer-readable storage media such as memory 508, 604, or 706). As should be readily understood, the terms "computer-readable storage media" or "non-transitory computer-readable media" include the media for storing of data, code and program instructions, such as memory 508, 604, or 706, and do not include portions of the media for storing transitory propagated or modulated data communication multi-carrier signals.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

The disclosed implementations include an apparatus comprising one or more processors and memory in communication with the one or more processors, the memory comprising code that, when executed, causes the one or more processors to control the apparatus to generate a registration in a database, the registration indicating that at least one channel is assigned to a device, send the identity of the at least one channel to the device, receive a message from the device, the message including information indicating that a selected channel of the at least one channel is determined to be encumbered, and, generate, in response to the message, an amendment to the database indicating that the selected channel is encumbered. The registration may comprise a first registration, the at least one channel may comprise a first at least one channel, and the code may further cause the one or more processors to control the apparatus to provide, in response to the message, the identity of a second at least one channel to the device, wherein the second at least one channel does not include the selected channel, and, generate a second registration in the database, the second registration indicating that the second at least one channel is assigned to the device.

The disclosed implementations include an apparatus comprising one or more processors and memory in communication with the one or more processors, the memory comprising code that, when executed, causes the one or more processors to control the apparatus to generate a registration in a database, the registration indicating that at least one channel is assigned to a device, send the identity of the at least one channel to the device, receive a message from the device, the message including information indicating that a selected channel of the at least one channel is determined to be encumbered, and, generate, in response to the received message, an amendment to the database indicating that the selected channel is encumbered. The registration may comprise a first registration, the at least one channel may comprise a first at least one channel, and the code may further cause the one or more processors to control the apparatus to send, in response to the message, the identity of a second at least one channel to the device, wherein the second at least one channel does not include the selected channel, and generate a second registration in the database, the second registration indicating that the second at least one channel is assigned to the device. The code may further cause the one or more processors to control the apparatus to verify whether or not the selected channel is encumbered. The device may comprise a first device, the registration may comprise a first registration, and the code may, in response to a verification that the selected channel is encumbered, further causes the one or more processors to change the amendment to a second registration in the database, the second registration indicating that the selected channel is assigned to a second device. The code may, in response to verification that the selected channel is not encumbered, further cause the one or more processors to remove the amendment from the database. The code may cause the one or more processors to verify whether or not the selected channel is encumbered by controlling the one or more processors to wait a predetermined time period after the generation of the amendment to the database for information indicating that the selected channel is encumbered, and, if no information is received within the predetermined time period indicating that the selected channel is encumbered, remove the amendment from the database. The database may comprise a first database and the code may cause the one or more processors to verify whether or not the selected channel is encumbered by initiating synchronization of the first database with at least one second database. The database may comprise a first database and the code may cause the one or more processors to verify whether or not the selected channel is encumbered b polling at least one second database. The apparatus may comprise a controller in a Spectrum Access System and the device may be assigned a tier level from a plurality of tier levels indicating priority for access to spectrum. The device may comprises a first device, the message may further include an identification of a tier level of a second device causing the encumbrance of the selected channel, and the amendment to the database may further indicate the tier level of the second device.

The disclosed implementations also include a device comprising one or more processors and memory in communication with the one or more processors, the memory comprising code that, when executed, causes the one or more processors to control the device to receive a first channel assignment assigning a first at least one channel to the device, monitor a metric on a selected channel of the first at least one channel, determine if a value of the metric indicates that the selected channel is encumbered, and, if the value of the metric indicates that the selected channel is encumbered, send a message to a controller, the message including information indicating that the selected channel is encumbered; and, receive a second channel assignment from the controller, the second channel assignment assigning a second at least one channel to the device. The message may comprise a first message and if the value of the metric does not indicate that the selected channel is encumbered, but the value of the metric is above a first threshold value, the code may further cause the one or more processors to control the device to send a second message to the controller, and, receive a third channel assignment from the controller, the third channel assignment assigning a third at least one channel to the device. The first and second messages may include location information about the device. If the value of the metric does not indicate that the selected channel is encumbered and the value of the metric is below a first threshold value, the code may further cause the one or more processors to control the device to continue operating using the first channel assignment. The selected channel may not be included in the second at least one channel. The device may operate in a Spectrum Access System and the device may be assigned a tier level from a plurality of tier levels indicating priorities for access to spectrum. The device may comprise a first device and, if the value of the metric indicates that the selected channel is encumbered, the code may further cause the one or more processors to control the device to identify a tier level of a second device causing the encumbrance on the selected channel, and send the identity of the tier level of the second device to the controller.

The disclosed implementations further include an apparatus comprising one or more processors and memory in communication with the one or more processors, the memory comprising code that, when executed, causes the one or more processors to control the apparatus to assign a first set of channels of a plurality of channels to a first plurality of devices, wherein each of the first plurality of devices is operating in one of a plurality of networks, receive indications of encumbrances on one or more channels of the assigned first set of channels from one or more of the first plurality of devices, process the indications of encumbrances using machine learning to generate an assignment scheme, and assign a second set of channels of the plurality of channels to a second plurality of devices based at least on the assignment scheme, wherein each of the second plurality of devices is operating in one of the plurality of networks. The one or more processors may control the apparatus to process the indications of encumbrances by controlling the apparatus to track the indications of encumbrances over a time period, determine a pattern of encumbrances on the one or more channels of the assigned first set of channels over the time period, and generate the assignment scheme based on the pattern of encumbrances. The assignment scheme may include a correlation of encumbrances of the plurality of channels with at least one event.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A controller of a network, comprising:
   a processor; and
   a memory in communication with the processor, the memory comprising executable instructions that, when executed by the processor, cause the processor to control the controller to perform functions of:
      registering, in a first database, a first channel assignment indicating that a first channel of the network is assigned to a first device;
      sending an identity of the first channel to the first device such that the first device establishes a first communication link with a first remote device via the assigned first channel;
      registering, in the first database, a second channel assignment that the first channel of the network is assigned to a second device;
      sending the identity of the first channel to the second device such that the second device establishes a second communication link with a second remote device via the first channel, wherein a first communication link is encumbered by the second communication link;
      receiving, from the first device, a message indicating that the first channel assigned to the first device is determined to be encumbered;
      in response to the received message, registering, in the first database, a third channel assignment indicating that a second channel is assigned to the first device; and
      sending an identity of the second channel to the first device such that the first device establishes the first communication link with the first remote device via the second channel.

2. The controller of claim 1, wherein the second channel is different from the first channel.

3. The controller of claim 1, the instructions further include instructions that, when executed by the processor, cause the processor to control the controller to perform a function of verifying that the first channel assigned to the first device is encumbered.

4. The controller of claim 3, wherein, for verifying that the first channel assigned to the first device is encumbered, the instructions further include instructions that, when executed by the processor, cause the processor to control the controller to perform functions of:
   updating the first database to register that the first channel assigned to the first device is encumbered; and
   determining that information indicating that the first channel assigned to the first device is encumbered is received within a predetermined time period from when the first database is updated.

5. The controller of claim 3, wherein, for verifying that the first channel assigned to the first device is encumbered, the instructions further include instructions that, when executed by the processor, cause the processor to control the controller to perform a function of initiating synchronization of the first database with a second database.

6. The controller of claim 3, wherein, for verifying that the first channel is encumbered, the instructions further include instructions that, when executed by the processor, cause the processor to control the controller to perform a function of polling a second database.

7. The controller of claim 1, comprising a controller in a spectrum access system, wherein the first device is assigned to one of a plurality of tier levels, each tier level indicating a different priority for accessing a spectrum.

8. The controller of claim 7, wherein the message further includes a tier level of the second device.

9. A device comprising:
a processor; and
a memory in communication with the processor, the memory comprising executable instructions that, when executed by the processor, cause the processor to control the device to perform functions of:
receiving a first channel assignment assigning a first channel to the device;
establishing, via the assigned first channel, a communication link with a remote device such that the remote device is connected to a network;
monitoring a metric on the first channel;
determining, based on the monitored metric, that the assigned first channel is encumbered;
sending, to a controller of the network, a first message indicating that the assigned first channel is encumbered; and
receiving, from the controller, a second channel assignment assigning a second channel to the device.

10. The device of claim 9, wherein the first channel is different from the second channel.

11. The device of claim 9, wherein the device is assigned to one of a plurality of tier levels of a spectrum access system, each tier level indicating a different priority for accessing a spectrum.

12. The device of claim 11, wherein:
the device comprises a first device, and
the instructions further include instructions that, when executed by the processor, cause the processor to control the first device to perform functions of:
identifying a tier level of the second device; and
sending the tier level of the second device to the controller.

13. The device of claim 9, wherein the device comprises a base station.

14. A method of operating a controller of a network for addressing an encumbrance within the network, comprising:
registering, in a first database, a first channel assignment indicating that a first channel of the network is assigned to a first device;
sending an identity of the first channel to the first device such that the first device establishes a first communication link with a first remote device via the assigned first channel;
registering, in the first database, a second channel assignment indicating that the first channel of the network is assigned to a second device;
sending the identity of the first channel to the second device such that the second device establishes a second communication link with a second remote device via the first channel, wherein a first communication link is encumbered by the second communication link sharing the same first channel;
receiving, from the first device, a message indicating that the first channel assigned to the first device is determined to be encumbered;
in response to the received message, registering, in the first database, a third channel assignment indicating that a second channel is assigned to the first device; and
sending an identify of the second channel to the first device such that the first device establishes the first communication link with the first remote device via the second channel.

15. The method of claim 14, wherein the second channel is different from the first channel.

16. The method of claim 14, further comprising verifying that the first channel assigned to the first device is encumbered.

17. The method of claim 16, wherein verifying that the first channel is encumbered comprises:
amending the first database to register that the first channel assigned to the first device is encumbered; and
determining that information indicating that the first channel assigned to the first device is encumbered is received within a predetermined time period from when the database is amended.

18. The method of claim 16, wherein verifying that the first channel assigned to the first device is encumbered comprises initiating synchronization of the first database with a second database.

19. The method of claim 16, wherein verifying that the first channel assigned to the first device is encumbered comprises polling a second database.

20. The method of claim 14, wherein the controller comprises a controller in a spectrum access system, and the first device is assigned to one of a plurality of tier levels, each tier level indicating a different priority for accessing a spectrum.

21. The method of claim 20, wherein the message further includes a tier level of the second device.

22. A method of operating a device, comprising:
receiving a first channel assignment assigning a first channel to the device;
establishing, via the assigned first channel, a communication link with a remote device such that the remote device is connected to a network;
monitoring a metric on the first channel;
determining, based on the monitored metric, that the assigned first channel is encumbered;
sending, to a controller of the network, a first message indicating that the assigned first channel is encumbered; and
receiving, from the controller, a second channel assignment assigning a second channel to the device.

23. The method of claim 22, wherein the first channel is different from the second channel.

24. The method of claim 22, wherein the device is assigned to one of a plurality of tier levels of a spectrum access system, each tier level indicating a different priority for accessing a spectrum.

25. The method of claim 24, wherein:
the device comprises a first device, and
the method further comprises:
identifying a tier level of a second device causing the encumbrance on the first channel; and
sending the tier level of the second device to the controller.

26. A controller of a network, comprising:
a processor; and
a memory in communication with the processor, the memory comprising executable instructions that, when executed by the processor, cause the processor to control the controller to perform functions of:
assigning, to a first device connected to the network, a first channel of the network such that the first device establishes a first communication link with a first remote device via the assigned first channel;
assigning, to a second device connected to the network, the first channel such that the second device establishes a second communication link with a second remote device via the assigned first channel, wherein the first communication link is encumbered by the second communication link sharing the same first channel;
receiving, from the first device, a message that the first channel assigned to the first device is determined to be encumbered; and
in response to the received message, assigning, to the first device, a second channel of the network such that the first device establishes the first communication link with the first remote device via the second channel.

27. The controller of claim 26, wherein the first channel is different from the second channel.

28. The controller of claim 26, wherein the instructions, when executed by the processor, further cause the processor to control the controller to perform functions of:
registering, in a database, a first channel assignment indicating that the first channel is assigned to the first device; and
registering, in the database, a second channel assignment indicating that the first channel is assigned to the second device.

29. The controller of claim 26, wherein, for assigning the first channel to the first device, the instructions, when executed by the processor, further cause the processor to control the controller to perform a function of sending, to the first device, an identity of the first channel.

30. The controller of claim 26, wherein, for assigning the first channel to the second device, the instructions, when executed by the processor, further cause the processor to control the controller to perform a function of sending, to the second device, an identity of the first channel.

31. The controller of claim 26, wherein for assigning the second channel to the first device, the instructions, when executed by the processor, further cause the processor to control the controller to perform functions of:
registering, in the database, a third channel assignment indicating that the second channel is assigned to the first device; and
sending, to the first device, an identity of the second channel.

32. The controller of claim 26, wherein the instructions, when executed by the processor, further cause the processor to control the controller to perform a function of updating, in response to the received message, the database to register that the first channel assigned to the first device is encumbered.

33. The controller of claim 26, wherein the instructions, when executed by the processor, further cause the processor to control the controller to perform a function of verifying that the first channel assigned to the first device is encumbered.

34. The controller of claim 33, wherein, for verifying that the first channel assigned to the first device is encumbered, the instructions, when executed by the processor, further cause the processor to control the controller to perform functions of:
updating the database to register that the first channel assigned to the first device is encumbered; and
determining that information indicating that the first channel assigned to the first device is encumbered is received within a predetermined time period from when the database is updated.

35. The controller 26, wherein:
the second device is assigned to one of a plurality of tier levels, each tier level indicating a different priority for accessing a spectrum, and
the message includes the assigned tier level of the second device.

* * * * *